US00RE42783E

(19) United States
(12) Reissued Patent
Gishi

(10) Patent Number: US RE42,783 E
(45) Date of Reissued Patent: Oct. 4, 2011

(54) LENS SHIFT MECHANISM AND PROJECTION TYPE VIDEO DISPLAY

(75) Inventor: Hiromitsu Gishi, Osaka (JP)

(73) Assignee: Sanyo Electric Co., Ltd., Moriguchi-shi (JP)

(21) Appl. No.: 12/155,679

(22) Filed: Jun. 6, 2008

Related U.S. Patent Documents

Reissue of:
(64) Patent No.: 7,055,971
Issued: Jun. 6, 2006
Appl. No.: 10/901,962
Filed: Jul. 30, 2004

(30) Foreign Application Priority Data

Aug. 4, 2003 (JP) ..... 2003-285943

(51) Int. Cl.
*G03B 21/14* (2006.01)
(52) U.S. Cl. ..... 353/101; 359/703
(58) Field of Classification Search ..... 353/101, 353/100; 359/694, 703, 813, 822
See application file for complete search history.

(56) References Cited

U.S. PATENT DOCUMENTS

| | | | |
|---|---|---|---|
| 2,968,217 | A | 1/1961 | Ewald |
| 5,465,126 | A | 11/1995 | Fukuda |
| 6,469,839 | B2 | 10/2002 | Agata |
| 2002/0001067 | A1 | 1/2002 | Tachibana |
| 2005/0024596 | A1 | 2/2005 | Kuroda et al. |
| 2005/0030492 | A1 | 2/2005 | Gishi |
| 2005/0083585 | A1 | 4/2005 | Lin et al. |
| 2006/0244933 | A1 | 11/2006 | Kuroda et al. |

FOREIGN PATENT DOCUMENTS

| | | | |
|---|---|---|---|
| DE | 198 24 917 | A1 | 12/1999 |
| JP | 56-62469 | A | 5/1981 |
| JP | 05-249409 | A | 9/1993 |
| JP | 06-331953 | A | 12/1994 |
| JP | 9-138377 | | 5/1997 |
| JP | 9-138377 | A | 5/1997 |
| JP | 2000-105329 | A | 4/2000 |
| JP | 2002-072351 | A | 3/2002 |

(Continued)

OTHER PUBLICATIONS

Search Report dated Sep. 21, 2007 in Corresponding European Patent Application No. 04 25 4619.
Japanese Office Action mailed Jan. 17, 2006, in corresponding Japanese Patent Application No. 2005-328782.

(Continued)

*Primary Examiner* — William C Dowling
(74) *Attorney, Agent, or Firm* — Westerman, Hattori, Daniels & Adrian, LLP

(57) ABSTRACT

When an attempt to move a projection lens in a horizontal direction (crosswise) in a state where it is positioned on the upper or lower side is made, it can be moved in the horizontal direction (crosswise) up to a certain range. However, a movement restraining convex area in a vertical movable base finally comes into contact with the corner inclined at an angle of 45 degrees in a fixed base. After this contact, movement in a leftward or rightward direction and an upward or downward direction which are limited directions is limited. Even if a dial and a dial are rotated in the limited directions under the limitation of the movement, they are slipped, thereby making it possible to prevent a force from being forcedly applied to a driving mechanism.

15 Claims, 4 Drawing Sheets

FOREIGN PATENT DOCUMENTS

| | | | |
|---|---|---|---|
| JP | 2002-206615 | A | 7/2002 |
| JP | 2004-020866 | A | 1/2004 |
| JP | 2004-317988 | A | 11/2004 |
| JP | 2005-018007 | A | 1/2005 |
| JP | 2005-062852 | A | 3/2005 |

OTHER PUBLICATIONS

Japanese Office Action mailed Dec. 21, 2010, in corresponding Japanese Patent Application No. 2010-150810.

LENS SHIFT MECHANISM AND PROJECTION TYPE VIDEO DISPLAY

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to a projection type video display comprising a lens shift mechanism.

Examples of a projection type video display include a liquid crystal projector. A known liquid crystal projector comprises a lens shift mechanism for moving a projected video up and down with its main body kept immovable and preventing the projected video from having a trapezoidal shape (JP-A-09-138377).

SUMMARY OF THE INVENTION

In a lens shift mechanism, a relatively large lens shift width can be ensured in a vertical direction (lengthwise) or a horizontal direction (crosswise). When the projection lens is greatly shifted in such a large lens shift width, however, an optical axis of a projection video and an optical axis of the projection lens are greatly shifted. As a result, the amount of projected light is reduced.

In view of the foregoing circumstances, an object of the present invention is to provide a lens shift mechanism and a projection type video display capable of avoiding reducing the amount of projected light by limiting the shifting range of the projection lens.

In a lens shift mechanism for shifting a projection lens for projecting a video in a direction perpendicular to its optical axis, a lens shift mechanism according to the present invention is characterized in that a first movable base moving in a vertical direction (lengthwise) and a second movable base moving in a horizontal direction (crosswise) are provided in an overlapped manner on a fixed base, each of the movable bases has an aperture for video light passage, and the projection lens is carried on either one of the movable bases, and by comprising a movement range limiting structure for limiting the moving range of the movable base having the projection lens carried thereon such that the moving range in the horizontal direction (crosswise) in a state where the projection lens is positioned on the upper or lower side is narrower than the moving range in the horizontal direction (crosswise) in a state where the projection lens is positioned at the center and limiting the moving range of the movable base having the projection lens carried thereon such that the moving range in the vertical direction (lengthwise) in a state where the projection lens is positioned on the right or left side is narrower than the moving range in the vertical direction (lengthwise) in a state where the projection lens is positioned at the center.

In the above-mentioned configuration, the moving range in the horizontal direction (crosswise) in a state where the projection lens is positioned at the center can be made relatively wide, while the moving range in the horizontal direction (crosswise) in a state where the projection lens is positioned on the upper or lower side can be made narrow. On the other hand, the moving range in the vertical direction (lengthwise) in a state where the projection lens is positioned at the center can be made relatively wide, while the moving range in the vertical direction (lengthwise) in a state where the projection lens is positioned on the right or left side can be made narrow. Accordingly, the amount of projected light can be prevented from being reduced by shifting the projection lens at a maximum.

In the above-mentioned lens shift mechanism, the projection lens may be carried on the first movable base, a movement limiting convex area may be formed on a reverse surface of the first movable base, and a movement limiting edge which stops the movement limiting convex area may be formed in an aperture for video light passage in the fixed base. Alternatively, the projection lens may be carried on the second movable base, a movement limiting convex area may be formed on a reverse surface of the second movable base, and a movement limiting edge which stops the movement limiting convex area may be formed in an aperture for video light passage in the fixed base.

The aperture in the fixed base may be formed not in the shape of a square respectively having right angles at its four corners but in the shape of an octagon having four sides inclined at an angle of 45 degrees, and the inclined side may be the movement limiting edge.

A driving mechanism for moving the first movable base and a driving mechanism for moving the second movable base may be respectively provided with dials for manually applying a driving force by frictional transmission, and each of the dials may be slipped and rotated under the limitation of movement of the movable bases. The slip and rotation can prevent an excessive force from being added to the driving mechanism or the like.

In a projection type video display that optically modulates light emitted from a light source by a light valve and projects a video by a projection lens, a projection type video display according to the present invention is characterized by comprising any one of the above-mentioned lens shift mechanisms.

The foregoing and other objects, features, aspects and advantages of the present invention will become more apparent from the following detailed description of the present invention when taken in conjunction with the accompanying drawings

DESCRIPTION OF THE PREFERRED EMBODIMENTS

Figure 4:
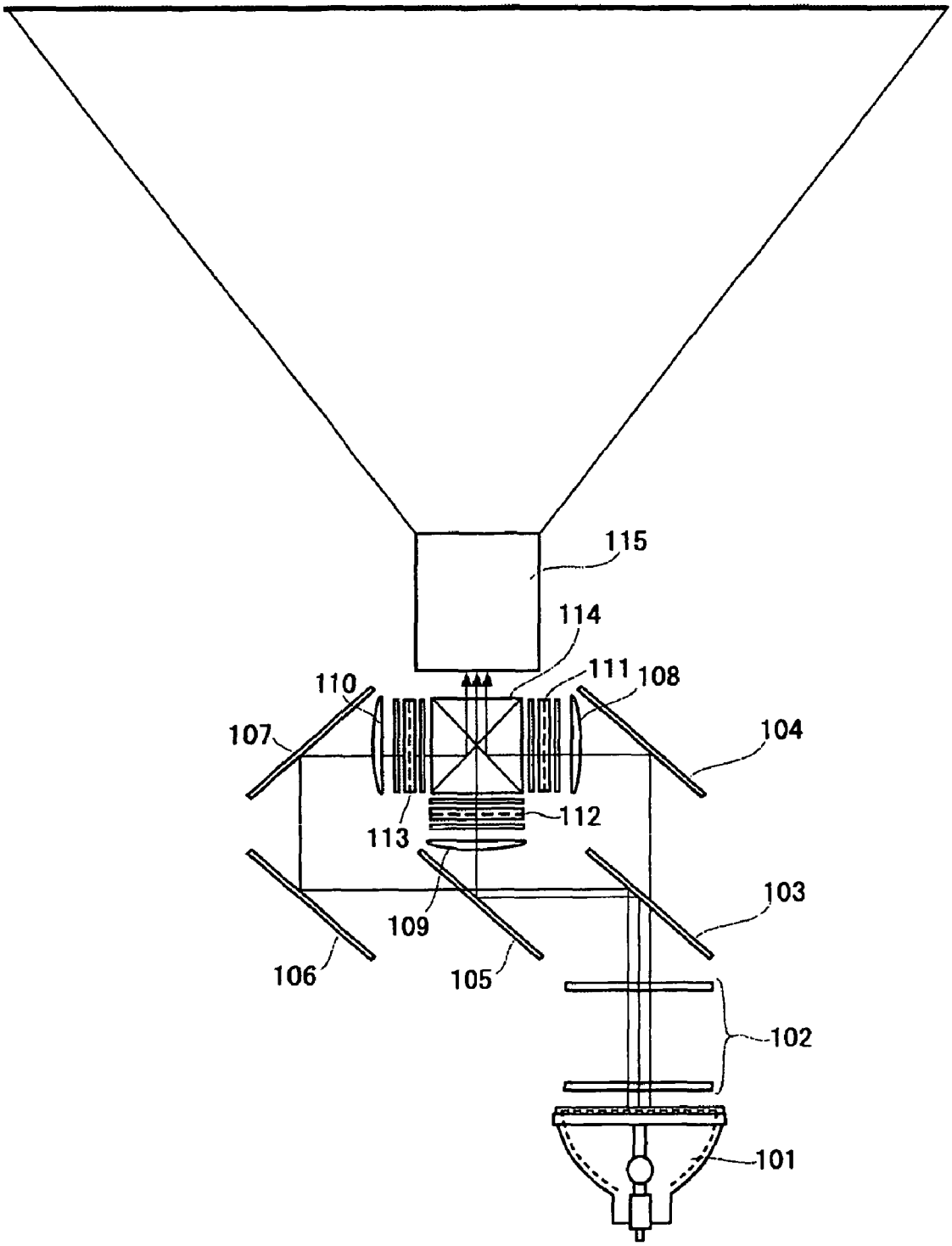
FIG. 4 is an explanatory view showing a general optical system for a liquid crystal projector.

A projection type video display according to an embodiment of the present invention will be described on the basis of FIGS. 1 to 4. First, an optical system for a liquid crystal projector is illustrated. FIG. 4 is a diagram illustrating an optical system for a three-panel color liquid crystal projector. A light emitter in a light source 101 is composed of a ultra-high pressure mercury lamp, a metal halide lamp, a xenon lamp, or the like, and its irradiated light is emitted after being changed into parallel lights by a parabolic reflector, and is introduced into an integrator lens 102.

The integrator lens 102 is composed of pairs of groups of lenses, and each of the pairs of lenses introduces the light emitted from the light source 101 into the whole surface of liquid crystal light valves 111, 112, and 113. The light which has passed through the integrator lens 102 is introduced into a first dichroic mirror 103.

The first dichroic mirror 103 transmits light in a red wavelength band and reflects light in a cyan (green+blue) wavelength band. The light in the red wavelength band which has passed through the first dichroic mirror 103 is reflected on a total reflecting mirror 104 so that its optical path is changed. The red light reflected on the total reflecting mirror 104 is optically modulated by passing through the transmission type liquid crystal light valve for red light 111 through a condenser lens 108. On the other hand, the light in the cyan wavelength band which has been reflected on the first dichroic mirror 103 is introduced into a second dichroic mirror 105.

The second dichroic mirror 105 transmits light in a blue wavelength band and reflects light in a green wavelength band. The light in the green wavelength band which has been reflected on the second dichroic mirror 105 is introduced into the transmission type liquid crystal light valve for green light 112 through a condenser lens 109, and is optically modulated by passing through the liquid crystal light valve 112. The light in the blue wavelength band which has passed through the second dichroic mirror 105 is introduced into the transmission type liquid crystal light valve for blue light 113 through total reflection mirrors 106 and 107 and a condenser lens 110, and is optically modulated by passing through the liquid crystal light valve 113.

Each of the liquid crystal light valves 111, 112, and 113 comprises an incidence-side light polarizing plate, a panel constructed by sealing a liquid crystal between a pair of glass boards (having a pixel electrode and an orientation film formed therein), and an emission-side light polarizing plate. Modulated lights (video lights in respective colors) modulated by respectively passing through the liquid crystal light valves 111, 112, and 113 are mixed by a dichroic prism 114, to be a color video light. The color video light is enlarged and projected by a projection lens unit 115, and is projected and displayed on a screen.

A lens shift mechanism will be then mainly described.

[Fixed Base 1]

As shown in FIGS. 1, 2A, 2B, and 3, a vertical driving mechanism 2 and a horizontal driving mechanism 3 are provided on a fixed base 1. The fixed base 1 is fixed to a front surface of a main body chassis (not shown), so that a dial 24 in the vertical driving mechanism 2 and a dial 34 in the horizontal driving mechanism 3 are exposed from a hole of a front cover in the liquid crystal projector. Further, a projection lens is attached to a vertical movable base 5. The projection lens projects from a circular hole of the front cover. Horizontal slots 1a are formed at two positions on the upper side and one position on the lower side of the fixed base 1. The length of the horizontal slot 1a corresponds to a moving range of a horizontal movable base 4, described later. Further, an aperture 1b for projected video light passage is formed in the fixed base 1. The aperture 1b is formed not in the shape of a square respectively having right angles at its four corners but in the shape of an octagon having four corners 1c inclined at an angle of 45 degrees.

[Vertical Driving Mechanism 2]

A driving mechanism chassis 21 is provided with a rotating member 22 which rotates around a horizontal axis. The dial 24 is fitted in the rotating member 22. When the dial 24 is turned in a state where the rotating member 22 is rotatable, the rotating member 22 is rotated by a frictional force. Even if the dial 24 is turned in a state where the rotating member 22 is unrotatable, however, the rotating member 22 is not rotated, and the dial 24 is only slipped and rotated. A bevel gear 22a is fixed to a right end in the drawing of the rotating member 22, and the bevel gear 22a is meshed with a bevel gear 23a. The bevel gear 23a is formed at a forward end of a first driving force transmitting member 23. The first driving force transmitting member 23 has its axis set in a forward and backward direction and is provided so as to be rotatable around the axis. A worm 23b is formed at a backward end of the first driving force transmitting member 23. The worm 23b is meshed with a worm gear 25a formed at a right end in the drawing of a second driving force transmitting member 25. The second driving force transmitting member 25 has its axis set in a horizontal direction (crosswise), and a gear 25b is formed at a left end in the drawing of the second driving force transmitting member 25. The gear 25b has a large width corresponding to a horizontal moving range of the vertical movable base 5 (that is, a horizontal moving range of the horizontal movable base 4).

[Horizontal Driving Mechanism 3]

Figure 1:
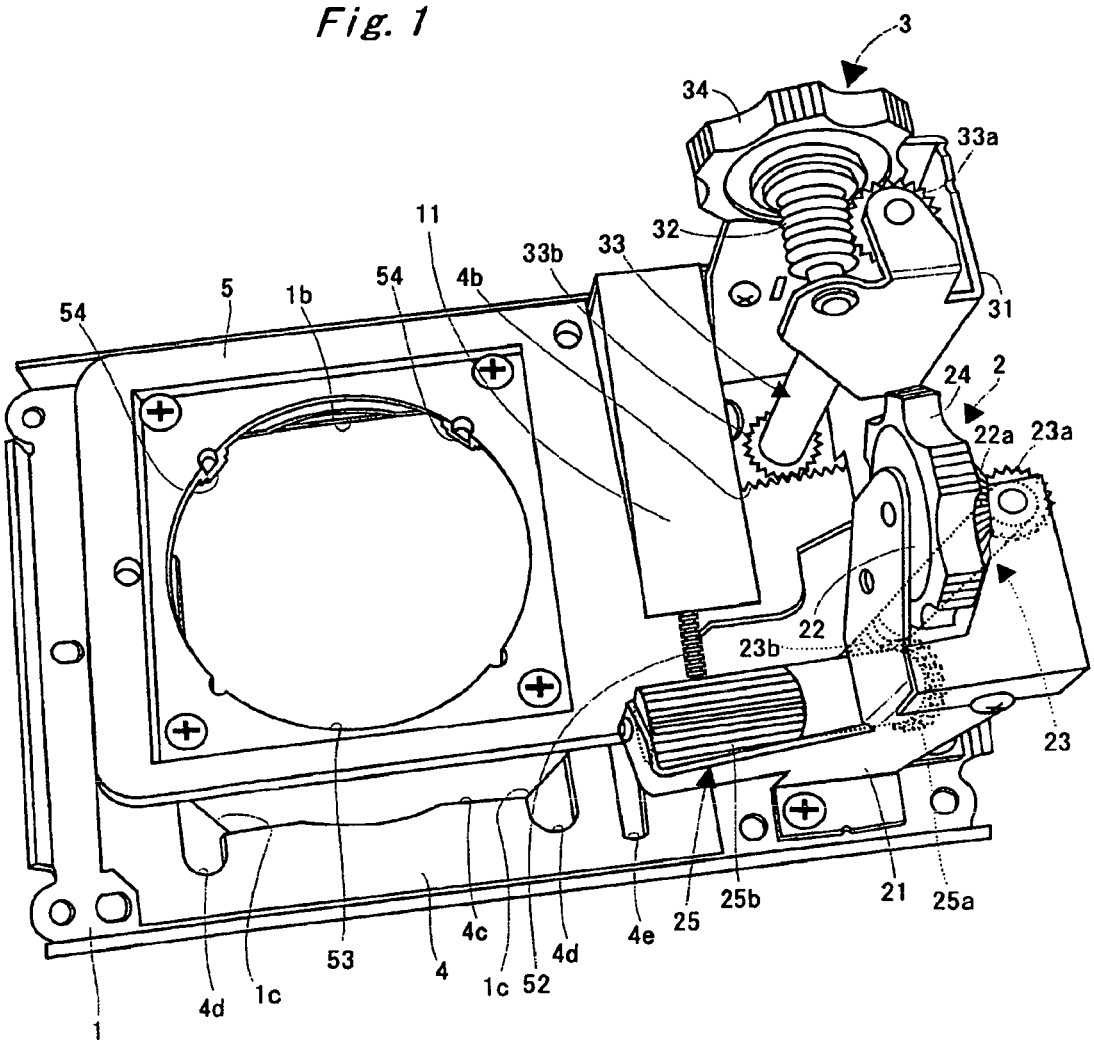
FIG. 1 is a perspective view showing a lens shift mechanism.

A driving mechanism chassis 31 is provided with a rotating member which rotates around a vertical axis (which is not illustrated because it is concealed in FIG. 1). The dial 34 is fitted in the rotating member. When the dial 34 is turned in a state where the rotating member is rotatable, the rotating member is rotated by a frictional force. Even if the dial 34 is turned in a state where the rotating member is unrotatable, however, the rotating member is not rotated, and the dial 34 is only slipped and rotated. A worm 32 is formed at a lower end of the rotating member, and the worm 32 is meshed with a warm gear 33a. The worm gear 33a is formed at a forward end of a driving force transmitting member 33. The driving force transmitting member 33 has its axis set in a forward and backward direction and is provided so as to be rotatable around the axis. A gear 33b is formed at a backward end of the driving force transmitting member 33.

[Horizontal Movable Base 4]

Figure 2A:
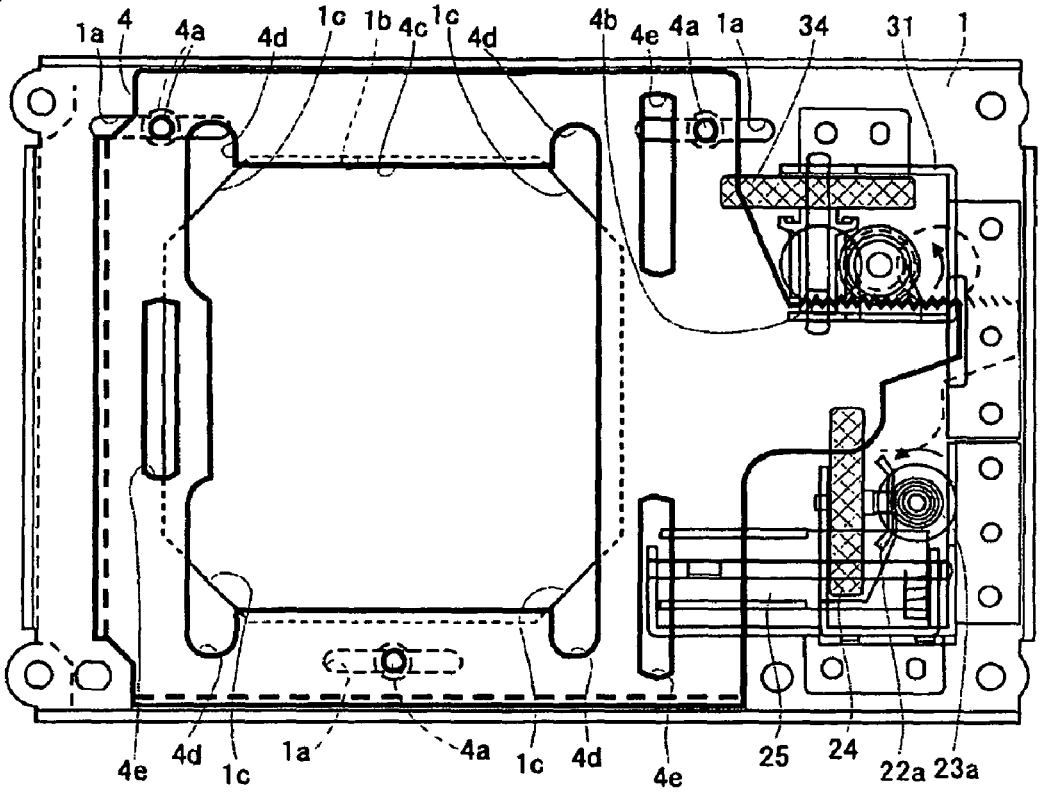
FIG. 2A is a plan view showing a state where a vertical movable base in the lens shift mechanism is omitted.
Figure 2B:
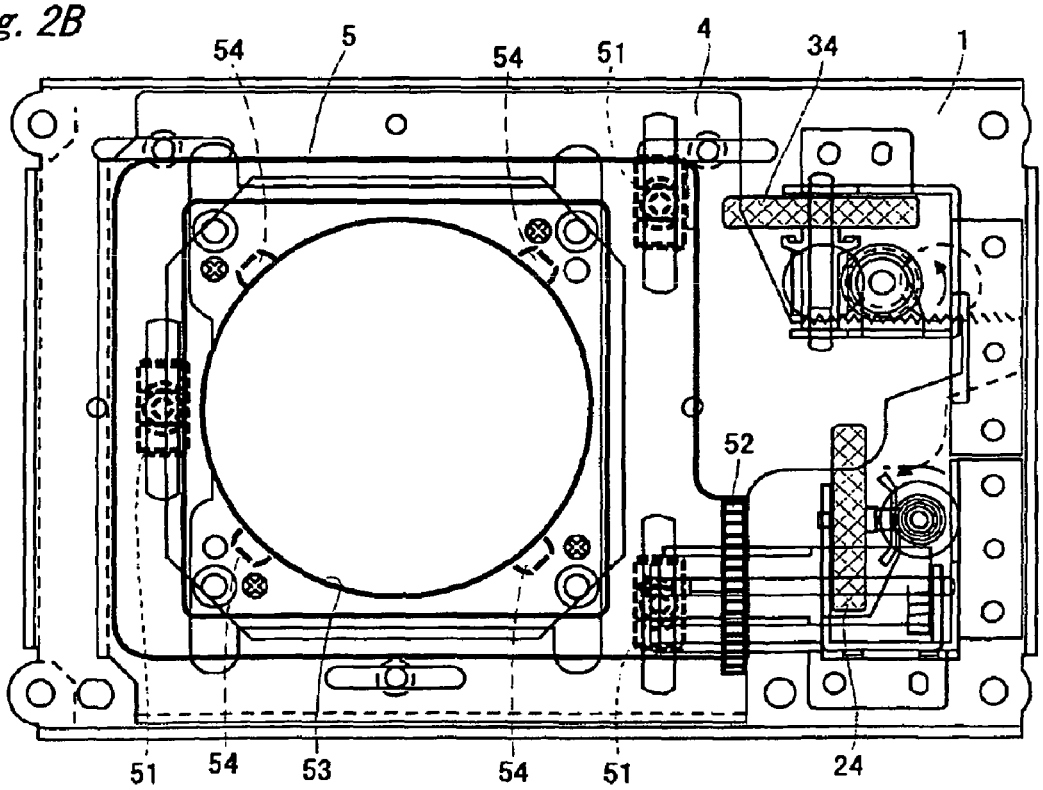
FIG. 2B is a plan view showing a state where a vertical movable base in the lens shift mechanism is not omitted.
Figure 3:
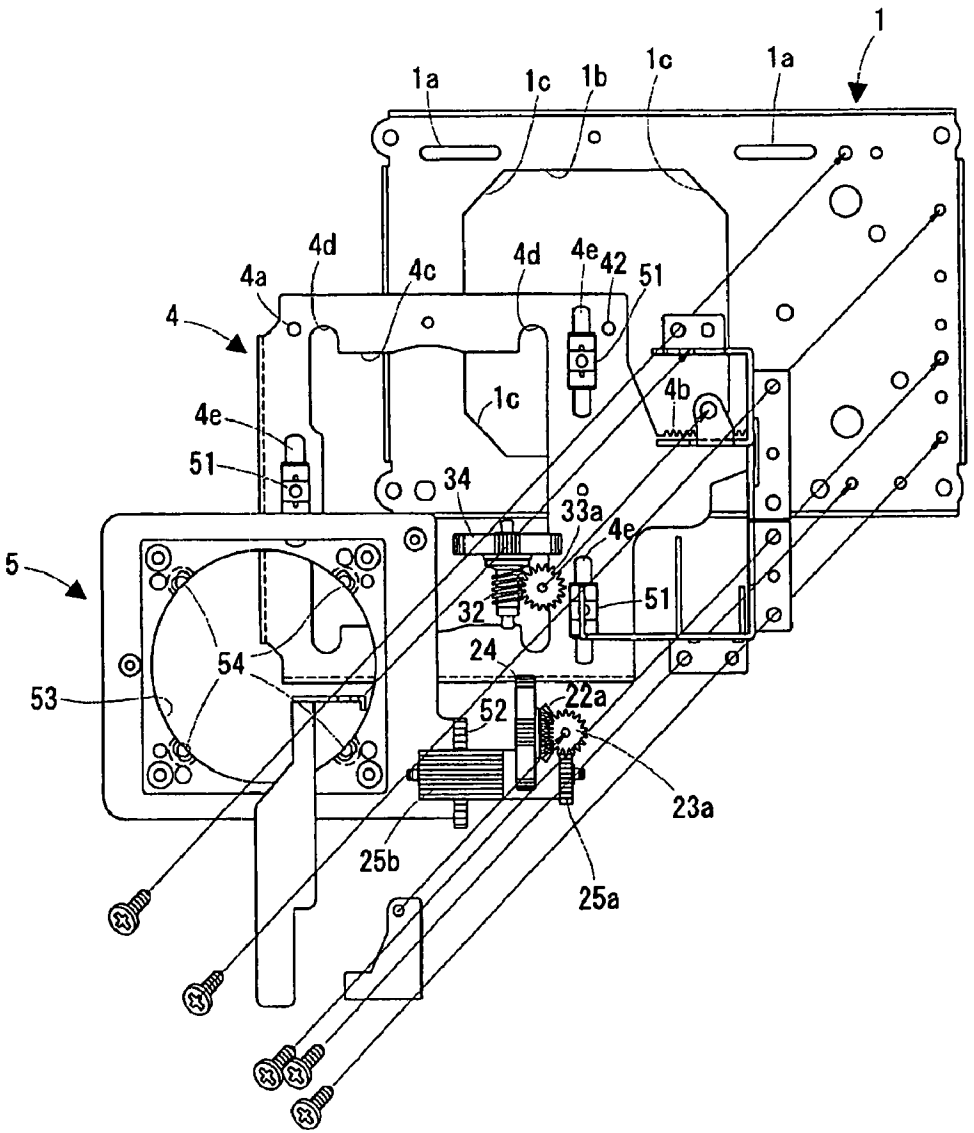
FIG. 3 is an exploded perspective view showing the lens shift mechanism.

The horizontal movable base 4 is indicated by a thick solid line in FIG. 2A. Projections 4a are respectively formed at two positions on the upper side and one position on the lower side of a reverse surface (a backward side surface) of the horizontal movable base 4 in correspondence with positions, where the three horizontal slots 1a are formed, in the fixed base 1. The projections 4a project from a reverse surface of the fixed base 1 after respectively passing through the horizontal slots 1a. A washer having a larger diameter than the width of the horizontal slot 1a is externally fitted in the projection 4a, and a coil spring is compressed and externally fitted on the projection 4a and the coil spring is subjected to holding processing. Consequently, the horizontal movable base 4 is horizontally moved because the projection 4a is guided by the horizontal slot 1a while being pressed against the fixed base 1 upon being pressed by the coil spring. A horizontal gear 4b is formed at a right end in the drawing of the horizontal movable base 4. A gear 33b in the driving force transmitting member 33 is meshed with the horizontal gear 4b, and the horizontal movable base 4 is horizontally moved by receiving a rotating force of the gear 33b. An aperture 4c for projected video light passage is formed at the center of the horizontal movable base 4, and inlets 4d communicating with the aperture 4c are formed at four corners of the aperture for passage 4c. The inlet 4d is formed so as to avoid interference with a boss (in which a mounting screw hole of the projection lens is formed) formed in the vertical movable base 5. Further, vertical slots 4e are formed at two positions on the right side of the aperture for passage 4c in the horizontal movable base 4, and a vertical slot 4e is formed at one position on the left side thereof.

[Vertical Movable Base 5]

The vertical movable base 5 is carried on the horizontal movable base 4. A boss having a screw hole is formed in correspondence with the position where the vertical slot 4e is formed on a reverse surface of the vertical movable base 5. A leaf spring member 51 having a larger width than that of the vertical slot 4e is arranged on a reverse surface of the horizontal movable base 4, and the leaf spring member 51 is attached to the boss by a screw. Consequently, the vertical movable base 5 is moved in a vertical direction (lengthwise) because the boss is guided by the vertical slot 4e while being pressed against the horizontal movable base 4 upon being pressed by the leaf spring member 51. A rack 52 with which the gear 25b in the second driving force transmitting member 25 is meshed is formed in the vertical direction (lengthwise) at a position on the lower right side of the vertical movable base 5. The vertical movable base 5 is driven in the vertical direction (lengthwise) by receiving a driving force of the gear 25b in the rack 52. Further, a circular aperture 53 for projected video light passage is formed at the center of the vertical movable base 5. Four movement restraining convex areas 54 are formed on the reverse surface of the vertical movable base 5. The movement restraining convex areas 54 are formed on orthogonal lines connecting the respective centers of the corners 1c inclined at an angle of 45 degrees in the fixed base 1 and in the vicinity of the circular aperture 53 in a state where both the vertical movable base 5 and the horizontal movable base 4 are positioned at the center (a state where the projection lens is positioned at the center). The length of projection of the movement restraining convex area 54 is set to such a degree that the movement restraining convex area 54 is somewhat beyond the reverse surface of the fixed base 1.

When the dial 24 is rotated by applying a force with fingers in an upward direction from the bottom in a state where both the vertical movable base 5 and the horizontal movable base 4 are positioned at the center (the projection lens is positioned at the center), the vertical movable base 5 is driven so that the projection lens is moved upward. Similarly, when the dial 24 is rotated by applying a force with fingers in a downward direction from the top, the vertical movable base 5 is driven so that the projection lens is moved downward. In this case, even if the projection lens is moved toward the uppermost position or the lowermost position, the movement restraining convex area 54 does not come into contact with an edge of the aperture 1b in the fixed base 1. When the dial 34 is rotated by applying a force in a rightward direction from the left in a state where both the vertical movable base 5 and the horizontal movable base 4 are positioned at the center (the projection lens is positioned at the center), the horizontal movable base 4 is driven so that the projection lens is moved rightward. Similarly, when the dial 34 is rotated by applying a force with fingers in a leftward direction from the right, the horizontal movable base 4 is driven so that the projection lens is moved leftward. In this case, even if the projection lens is moved toward the leftmost position or the rightmost position, the movement restraining convex area 54 does not come into contact with the edge of the aperture 1b in the fixed base 1.

On the other hand, when an attempt to move the projection lens in a horizontal direction (crosswise) in a state where it is positioned on the upper or lower side is made, it can be moved in a horizontal direction (crosswise) up to a certain range. However, the movement restraining convex area 54 in the vertical movable base 5 finally comes into contact with the corner 1c inclined at an angle of 45 degrees in the fixed base 1. After this contact, movement in a leftward or rightward direction and an upward or downward direction which are the directions of limitation is limited. Even if the dial 24 and the dial 34 are rotated in the limited directions under the limitation of the movement, they are slipped, thereby making it possible to avoid an excessive force from being added to the driving mechanism. On the other hand, when an attempt to move the projection lens in a vertical direction (lengthwise) in a state where it is positioned on the right or left side is made, it can be moved in a vertical direction (lengthwise) up to a certain range. However, the movement restraining convex area 54 in the vertical movable base 5 finally comes into contact with the corner 1c inclined at an angle of 45 degrees in the fixed base 1. After this contact, movement in an upward or downward direction and a leftward or rightward direction which are the directions of limitation is limited. Even if the dial 34 and the dial 24 are rotated in the limited directions under the limitation of the movement, they are slipped, thereby making it possible to avoid an excessive force from being added to the driving mechanism.

The configuration of the projection type video display is not limited to one having a video producing optical system using three transmission type liquid crystal display panels. It may be a configuration comprising another video producing optical system. The above-mentioned lens shift mechanism is arranged by being turned at an angle of 90 degrees, thereby making it possible to horizontally move the vertical movable base 5 and vertically move the horizontal movable base 4. Although the corner 1c inclined at an angle of 45 degrees in the fixed base 1 is taken as a movement limiting edge, the present invention is not limited to the same. For example, the movement limiting edge may be formed in a circular arc shape.

As described in the foregoing, according to the present invention, the amount of projected light can be prevented from being reduced by limiting the shifting range of the projection lens.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a lens shift mechanism for shifting a projection lens for projecting a video in a direction perpendicular to its optical axis, a lens shift mechanism wherein a first movable base moving in a vertical direction (lengthwise) and a second movable base moving in a horizontal direction (crosswise) are provided in an overlapped manner on a fixed base, each of the movable bases has an aperture for video light passage, and a projection lens is carried on either one of the movable bases, and comprising a movement range limiting structure for limiting the moving range of the movable base having the projection lens carried thereon such that the moving range in the horizontal direction (crosswise) in a state where the projection lens is positioned on the upper or lower side is narrower than the moving range in the horizontal direction (crosswise) in a state where the projection lens is positioned at the center and limiting the moving range of the movable base having the projection lens carried thereon such that the moving range in the vertical direction (lengthwise) in a state where the projection lens is positioned on the right or left side is narrower than the moving range in the vertical direction (lengthwise) in a state where the projection lens is positioned at the center.

2. The lens shift mechanism according to claim 1, wherein the projection lens is carried on the first movable base, a movement limiting convex area is formed on a reverse surface of the first movable base, and a movement limiting edge which stops the movement limiting convex area is formed in an aperture for video light passage in the fixed base.

3. The lens shift mechanism according to claim 1, wherein the projection lens is carried on the second movable base, a movement limiting convex area is formed on a reverse surface of the second movable base, and a movement limiting edge which stops the movement limiting convex area is formed in an aperture for video light passage in the fixed base.

4. The lens shift mechanism according to claim 2, wherein the aperture in the fixed base is formed not in the shape of such a square respectively having right angles at its four corners but in the shape of an octagon having four sides inclined at an angle of 45 degrees, and the inclined side is the movement limiting edge.

5. The lens shift mechanism according to claim 3, wherein the aperture in the fixed base is formed not in the shape of such a square respectively having right angles at its four corners but in the shape of an octagon having four sides inclined at an angle of 45 degrees, and the inclined side is the movement limiting edge.

6. The lens shift mechanism according to claim 1, wherein a driving mechanism for moving the first movable base and a driving mechanism for moving the second movable base are respectively provided with dials for manually applying a driving force by frictional transmission, and each of the dials is slipped and rotated under the limitation of movement of the movable bases.

7. The lens shift mechanism according to claim 2, wherein a driving mechanism for moving the first movable base and a driving mechanism for moving the second movable base are respectively provided with dials for manually applying a driving force by frictional transmission, and each of the dials is slipped and rotated under the limitation of movement of the movable bases.

8. The lens shift mechanism according to claim 3, wherein a driving mechanism for moving the first movable base and a driving mechanism for moving the second movable base are respectively provided with dials for manually applying a driving force by frictional transmission, and each of the dials is slipped and rotated under the limitation of movement of the movable bases.

9. The lens shift mechanism according to claim 4, wherein a driving mechanism for moving the first movable base and a driving mechanism for moving the second movable base are respectively provided with dials for manually applying a driving force by frictional transmission, and each of the dials is slipped and rotated under the limitation of movement of the movable bases.

10. The lens shift mechanism according to claim 5, wherein a driving mechanism for moving the first movable base and a driving mechanism for moving the second movable base are respectively provided with dials for manually applying a driving force by frictional transmission, and each of the dials is slipped and rotated under the limitation of movement of the movable bases.

11. In a projection type video display that optically modulates light emitted from a light source by a light valve and projects a video by a projection lens, a projection type video display comprising:

the lens shift mechanism according to any one of claims 1 to 10.

*12. In a lens shift mechanism for shifting a projection lens for projecting a video in a direction perpendicular to its optical axis,*

*a lens shift mechanism wherein*

*a first movable base moving in a vertical direction (lengthwise) and a second movable base moving in a horizontal direction (crosswise) are provided in an overlapped manner on a fixed base, each of the movable bases has an aperture for video light passage, and a projection lens is carried on either one of the movable bases, and comprising*

*a movement range limiting structure for limiting the moving range of the movable base having the projection lens carried thereon such that the moving range in the horizontal direction (crosswise) in a state where the projection lens is positioned on the upper or lower side is narrower than the moving range in the horizontal direction (crosswise) in a state where the projection lens is positioned at the center.*

*13. In a lens shift mechanism for shifting a projection lens for projecting a video in a direction perpendicular to its optical axis,*

*a lens shift mechanism wherein*

*a first movable base moving in a vertical direction (lengthwise) and a second movable base moving in a horizontal direction (crosswise) are provided in an overlapped manner on a fixed base, each of the movable bases has an aperture for video light passage, and a projection lens is carried on either one of the movable bases, and comprising*

*a movement range limiting structure for limiting the moving range of the movable base having the projection lens carried thereon such that the moving range in the vertical direction (lengthwise) in a state where the projection lens is positioned on the right or left side is narrower than the moving range in the vertical direction (lengthwise) in a state where the projection lens is positioned at the center.*

*14. A lens shift mechanism comprising:*

*a fixed base, the fixed base having an aperture for video light passage;*

*a first movable base movably supported on the fixed base, the first movable base having an aperture for video light passage;*

*a first driving mechanism for moving the first movable base relatively to the fixed base in a horizontal direction or a vertical direction in a first range;*

*a second movable base movably supported on the first movable base, the second movable base having an aperture for video light passage;*

*a second driving mechanism for moving the second movable base relatively to the first movable base in a vertical direction or a horizontal direction in a second range;*

*a projection lens, the projection lens being carried on the first movable base or the second movable base, the optical axis of the projection lens being in a direction substantially perpendicular to a plane of movement of the first movable base and the second movable base; and*

*a movement range regulator for allowing moving of the projection lens such that a moving range of the projection lens in the vertical direction is the first range or the second range in a case where the projection lens is moved in a range from the center to a predetermined position in the horizontal direction and limiting the moving range of the projection lens such that the moving range of the projection lens in the vertical direction is smaller than the first range or the second range in a case*

*where the projection lens is moved over the predetermined position in the horizontal direction, the movement range regulator being positioned between the fixed base and the first movable base or the second movable base.*

*15. A lens shift mechanism comprising:*

*a fixed base, the fixed base having an aperture for video light passage;*

*a first movable base movably supported on the fixed base, the first movable base having an aperture for video light passage;*

*a first driving mechanism for moving the first movable base relatively to the fixed base in a horizontal direction or a vertical direction in a first range;*

*a second movable base movably supported on the first movable base, the second movable base having an aperture for video light passage;*

*a second driving mechanism for moving the second movable base relatively to the first movable base in a vertical direction or a horizontal direction in a second range;*

*a projection lens, the projection lens being carried on the first movable base or the second movable base, the optical axis of the projection lens being in a direction substantially perpendicular to a plane of movement of the first movable base and the second movable base; and*

*a movement range regulator for allowing moving of the projection lens such that a moving range of the projection lens in the horizontal direction is the first range or the second range in a case where the projection lens is moved in a range from the center to a predetermined position in the vertical direction and limiting the moving range of the projection lens such that the moving range of the projection lens in the horizontal direction is smaller than the first range or the second range in a case where the projection lens is moved over the predetermined position in the vertical direction, the movement range regulator being positioned between the fixed base and the first movable base or the second movable base.*

* * * * *